(12) United States Patent
Huang

(10) Patent No.: US 8,161,535 B2
(45) Date of Patent: Apr. 17, 2012

(54) CONTROL SYSTEM AND METHOD

(75) Inventor: Yong Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 398 days.

(21) Appl. No.: 12/390,087

(22) Filed: Feb. 20, 2009

(65) Prior Publication Data
US 2009/0158387 A1 Jun. 18, 2009

Related U.S. Application Data

(63) Continuation of application No. PCT/CN2007/070529, filed on Aug. 21, 2007.

(30) Foreign Application Priority Data

Aug. 22, 2006 (CN) .......................... 2006 1 0121795

(51) Int. Cl.
*H04L 29/06* (2006.01)
(52) U.S. Cl. .................... 726/6; 726/3; 370/351
(58) Field of Classification Search .................. 370/351, 370/382; 709/229; 726/1, 2, 6, 12, 3
See application file for complete search history.

(56) References Cited

U.S. PATENT DOCUMENTS

| | | | | |
|---|---|---|---|---|
| 7,656,873 | B2 * | 2/2010 | Li et al. ......................... | 370/392 |
| 2002/0165906 | A1 * | 11/2002 | Ricart et al. ................... | 709/203 |
| 2003/0079144 | A1 | 4/2003 | Kakemizu et al. | |
| 2004/0039839 | A1 * | 2/2004 | Kalyanaraman et al. ..... | 709/238 |
| 2006/0031925 | A1 | 2/2006 | Natarajan et al. | |
| 2006/0245426 | A1 * | 11/2006 | Rasanen ....................... | 370/389 |
| 2007/0115855 | A1 | 5/2007 | Hu et al. | |
| 2008/0232369 | A1 * | 9/2008 | Belanger et al. .............. | 370/392 |
| 2009/0003330 | A1 * | 1/2009 | Li et al. ......................... | 370/389 |
| 2009/0028159 | A1 * | 1/2009 | Boudreau et al. ........ | 370/395.21 |

FOREIGN PATENT DOCUMENTS

| | | |
|---|---|---|
| CN | 1555162 A | 12/2004 |
| CN | 1555164 A | 12/2004 |
| CN | 1595887 A | 3/2005 |
| CN | 1728663 A | 2/2006 |

(Continued)

OTHER PUBLICATIONS

ETSI ES 282 001 V1.1.1 (Aug. 2005)Telecommunications and Internet converged Services and Protocols for Advanced Networking (TISPAN); NGN Functional Architecture Release 1.*

(Continued)

*Primary Examiner* — Jung Kim
*Assistant Examiner* — Tri Tran
(74) *Attorney, Agent, or Firm* — Leydig, Voit & Mayer, Ltd.

(57) ABSTRACT

A control system includes a user management server or server group, a Service Policy Decision Function (SPDF) server, an Access-Resource and Admission Control Function (A-RACF) server, and a control interface location between the user management server or server group and the SPDF n server for transmitting the information. In addition, a control method using the control system above and a control device are provided. By the technical solutions above, when there are many access network operators connecting to the uniform network operation operator, the problem that the SPDF server searches the A-RACF server is solved, and the user information is acquired by setting the interface between the SPDF server and the user management server or server group.

12 Claims, 8 Drawing Sheets

FOREIGN PATENT DOCUMENTS

| | | |
|---|---|---|
| CN | 1747467 A | 3/2006 |
| WO | 01/84765 A2 | 11/2001 |

OTHER PUBLICATIONS

ETSI ES 282 004 V1.1.1, (Mar. 2006) Telecommunications and Internet converged Services and Protocols for Advanced Networking (TISPAN); NGN Functional Architecture; Network Attachment Sub-System (NASS).*

ETSI ES 282 003 V1.1.1, Jun. 2006 by European Telecommunications Standards Institute—RACS.*

ETSI ES 282 004 V1.1.1, Mar. 2006 by European Telecommunications Standards Institute—NASS.*

Written Opinion of the International Searching Authority in corresponding PCT Application No. PCT/CN7/070529 (Dec. 13, 2007).

1st Office Action in corresponding European Application No. 07785427.1 (Jan. 19, 2010).

2nd Office Action in corresponding European Application No. 07785427.1 (Nov. 23, 2010).

"Telecommunications and Internet Converged Services and Protocols for Advanced Networking (TISPAN); Resource and Admission Control Sub-System (RACS); Functional Architecture; Final Draft ETSI ES 282 003," *ETSI Standards*, TISPAN(V2.1.0) (Jun. 2006).

"Telecommunications and Internet Converged Services and Protocols for Advanced Networking (TISPAN); NGN Functional Architecture; Network Attachment Sub-System (NASS); ETSI ES 282 004," ETSI Standards, TISPAN(V1.1.1) (Jun. 2006).

"Draft Recommendation Y.RACF Version 9.4; TD 109 Rev. 1," International Telecommunication Union, ITU-T Draft Study Period 2005-2008, Study Group 13 (Jul. 2006).

"Difference and Convergence of RACF and RACS FEs and Interfaces; D 817," International Telecommunication Union, ITU-T Draft Study Period 2005-2008, Study Group 13 (Jul. 2006).

State Intellectual Property Office of the People'S Republic of China, Written Opinion of the International Searching Authority in International Patent Application No. PCT/CN2007/070529 (Dec. 13, 2007).

European Patent Office, Examination Report in European Application No. 07785427.1 (Jan. 19, 2010).

* cited by examiner

CONTROL SYSTEM AND METHOD

CROSS-REFERENCE TO RELATED APPLICATIONS

This application is a continuation of International Patent application No. PCT/CN2007/070529, filed Aug. 21, 2007, which claims priority to Chinese Patent Application No. 200610121795.7, filed Aug. 22, 2006, both of which are hereby incorporated by reference in their entirety.

FIELD OF THE INVENTION

The present invention relates to the field of telecommunications and in particular to a control system, a control method and a control device.

BACKGROUND OF THE INVENTION

The ETSI Telecommunications and Internet converged Services and Protocols for Advanced Networking (TISPAN) works on creating requirements, network architecture and related protocols of the Next Generation Networks (NGN). Logically the NGN includes three layers: data bearing layer, bearer control layer, and service control layer. Generally there are two systems in the bearer control layer: Network Attachment Subsystem (NASS) and Resource and Admission Control Subsystem (RACS). The NASS carries out address and authentication management for users, and provides user location information for the service control layer and the RACS. The RACS manages bearer network resources, and performs admission control for Quality of Service (QoS) requests of the service control layer. A brief introduction of this is as follows.

The structure of a TISPAN RACS is illustrated in FIG. 1. The Session Policy Decision Function (SPDF) is a service-based policy decision function module, providing a Gq' interface for the service control layer and providing a bearer service for an application function (AF). The interface receives service-based QoS requests from the service control layer. When a user requests a service, a session is established with the AF. The AF extracts required QoS parameters according to the service request in the session, and requests the SPDF for bearer service. The request includes type of service, bandwidth, quintuple information of flow, user representation, flow operation instruction and so forth. That is, the service control layer requests the bearer control layer to set a QoS channel for a particular service. Policy rules are stored at the SPDF to make service-based decisions. The SPDF locates an access gateway, related resources and a control entity A-RACF of the user, and transfers the QoS request to the A-RACF via Rq interface. The A-RACF carries out admission control of QoS. The A-RACF receives the QoS request for an access network managed by the A-RACF via the Rq interface, acquires user profile data and location information (which are provided by the NASS, detailed description will not be given herein.) via an e4 interface, and determines whether the network can provide QoS for the user. A clear response of admission/non-admission is given to the SPDF by bandwidth reservation or after implementing QoS to a bearer layer entity.

If the QoS request can be implemented, the A-RACF sends a command to a RCEF and an Access Node (ΔN) through RE and RA interface operations, according to flow status as indicated in the request. Located in an edge device of the access network, the RCEF carries out QoS implementation.

In addition, the SPDF instructs a C-BGF to implement QoS via Ia interface, which also performs NAT.

The functionality architecture of the RACS can support management, control and implementation of user end-to-end QoS, provide reference function decomposition and interfaces for operators such as network operators and service providers, and provide authentication and accounting capabilities between different providers. The NASS stores user profile information and performs access authentication and accounting, address allocation, user network parameter configuration, user end device management, etc. The RACS carries out QoS control and management. With the RACS, the bearer control layer can control each network element of the service control layer, which makes the network manageable and operable. Also, the bearer control layer provides a uniform access interface, covering the differences of different networks. The service control layer performs service-related control and provides management of a variety of services for users.

FIG. 2 illustrates the structure of an NASS. As illustrated in FIG. 2, the NASS includes (1) an Access Management Function (AMF) entity, adapted to coordinate and forward network access requests initiated by a user terminal device, request a Network Access Configuration Function (NACF) entity to assign an IP address and other network parameters to the user terminal device, and interact with a User Access Authorization Function (UAAF) entity for user authentication, authorization, access denial and so forth; (2) an NACF entity, adapted to assign an IP address to a user terminal device, and distribute other network parameters to the user terminal device, such as a Domain Name Server (DNS) address and a session signaling proxy address; (3) a Connectivity Session Location Function (CLF) entity, adapted to associate the identity of a user with physical/geographical location information, IP address and other location information when a user uses a particular connectivity session service, provide a query interface between the service control layer an the bearer control layer, and provide related information of the user bear network required by the service control layer for the service control layer, such as a user ID and user location information; (4) a User Access Authorization Function (UAAF) entity, adapted to perform authentication and authorization of a user accessing the network, and send activation and profile information of the user to the CLF via a4 interface; and (5) a Profile Data Base Function (PDBF) entity, adapted to store subscriber authentication information, user identity authentication methods, additional important data, etc.

The NASS also includes the following system interfaces (1) an e1 interface, between an AMF and a user terminal device, through which a user terminal device initiates an access request to a network, in which an Access Relay Function (ARF) entity can implement relay function of the access request and insert location information of the network that the user terminal device accesses; (2) an e2 interface, between a CLF and a service control and application subsystem, through which the NASS provides for the service control and application subsystem user access location information (e.g., an access device identifier, a route identifier), access authentication result, etc; and (3) an e4 interface, between a CLF and a RACS, through which the NASS provides user access location and QoS subscription information for the RACS, and by which the RACS determines resource allocation and whether resource allocation meets a service requirement according to an access device and an accessing method of the user.

Seen as part of a network model, the SPDF belongs to a Network Service Provider (NSP) which provides Internet access services, normally providing a core network, and provides IP addresses for users. The A-RACF belongs to a Network Access Provider (NAP) operating a network access device with which a user can access the core network. Normally the A-RACF is embodied as an access resource management and admission control server managing access network resources and performing admission control of QoS requests. Different NAPs handle network accesses in different areas. When multiple NAPs of different areas access the core network of one NSP, functionally, there is one SPDF connected with multiple A-RACFs. Furthermore, as illustrated in FIG. 3, the AMF belongs to an NAP, and the NACF, the CLF and the UAAF belong to an NSP.

In FIG. 3, two NAP1 and NAP2 are connected to an NSP (user management server). User management is carried out at the NSP. Each NAP includes an AMF and an A-RACF.

This issue is briefly discussed in the draft standards of RACS at present. An SPDF finds an A-RACF based on local configuration. Practically, information that can be used by the SPDF is merely user identifier and IP address information from an AF. Home domain information can be carried in the user identifier. However, if a user visits another network, a correct A-RACF cannot be found based on the home domain information. As illustrated in FIG. 3 about user IP address space, because IP addresses are assigned collectively at an NSP, if different IP address spaces are assigned to different NSPs, corresponding A-RACFs can be found based on a corresponding relationship between the IP address spaces and A-RACF addresses configured at the SPDF. However this limits the network. For example, a correct A-RACF can not be found when a user changes his access location carrying his IP address with him. In practice, multiple access resource management and admission control servers may be cascaded, which results in the problem in the existing systems for an upper-level access resource management and admission control server to find a lower-level access resource management and admission control function server.

SUMMARY OF THE INVENTION

In view of the above problems, the present invention intends to solve one or more of the problems in the existing systems as stated above. An object of the present invention is to provide a control system and a control method and a control device capable of finding an access resource management and admission control server.

Embodiments of the invention are implemented by the technical solutions as follows.

An embodiment of the invention provides a control system including (1) a user management server or server group, a policy decision server and an access resource management and admission control server; and (2) a control interface, between the user management server or server group and the policy decision server, adapted to transfer information. The user management server or server group sends location identifier information of the access resource management and admission control server or location information of a user access point to the policy decision server via the control interface, wherein the policy decision server locates the access resource management and admission control server according to the location identifier information or the location information.

An embodiment of the invention provides a control method for finding an access resource management and admission control servers, including (1) acquiring location information of a user access point; (2) determining for a pre-configured corresponding relationship between the location information of the user access point and location identifier information of an access resource management and admission control server according to the acquired location information of the user access point, to determine the location identifier information; and (3) locating the access resource management and admission control server based on the location identifier information.

The above technical solutions of the present invention have the following advantages. The problem for an SPDF to find an A-RACF is solved when a plurality of access network operators connect to a uniform network service provider. And user information can be acquired via an interface configured between the SPDF and an NASS (user management server or server group).

BRIEF DESCRIPTION OF THE DRAWINGS

Figures, which constitute part of this application, are provided for a better understanding of the present invention. Provided for interpretation of the invention, embodiments of the invention and the descriptions thereof do not limit the invention. In the figures.

DETAILED DESCRIPTION OF THE EMBODIMENTS

Exemplary embodiments of the invention are described in detail hereinafter by reference to the drawings constituting part of the application and are intended to interpret the principle of the invention together with the embodiments of the invention.

Embodiment 1

Figure 4:
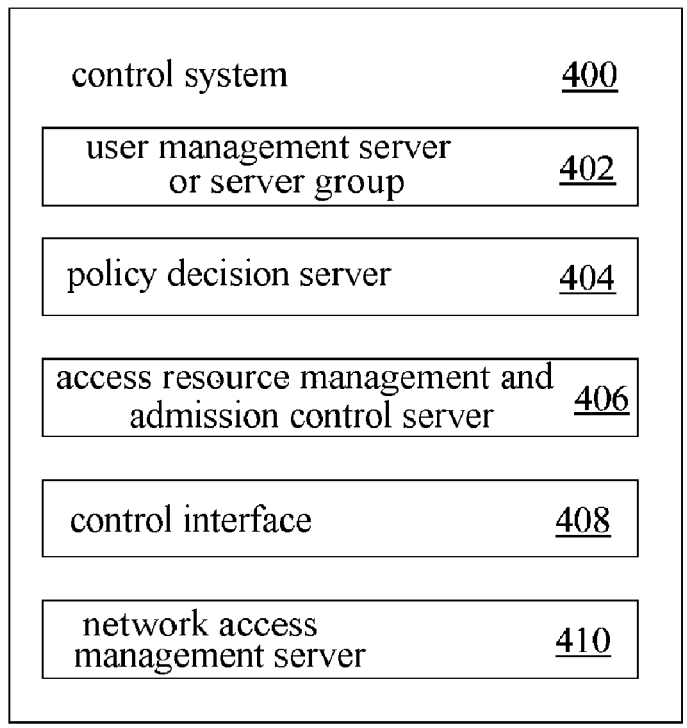
FIG. 4 is a block diagram of a control system according to a first embodiment of the invention.

A control system is provided in the first embodiment of the invention which is described hereinafter by reference to FIGS. 4 to 7. FIG. 4 is a block diagram of a control system according to the first embodiment of the invention.

As illustrated in FIG. 4, a control system 400 according to this embodiment includes: a user management server or server group 402, a policy decision server 404, an access resource management and admission control server 406, and a control interface 408 between the user management server or server group 402 and the policy decision server 404 for transferring information. The user management server or server group 402 sends location identifier information of the access resource management and admission control server 406 or location information of a user access point to the policy decision server 404 via the control interface 408.

Figure 6:
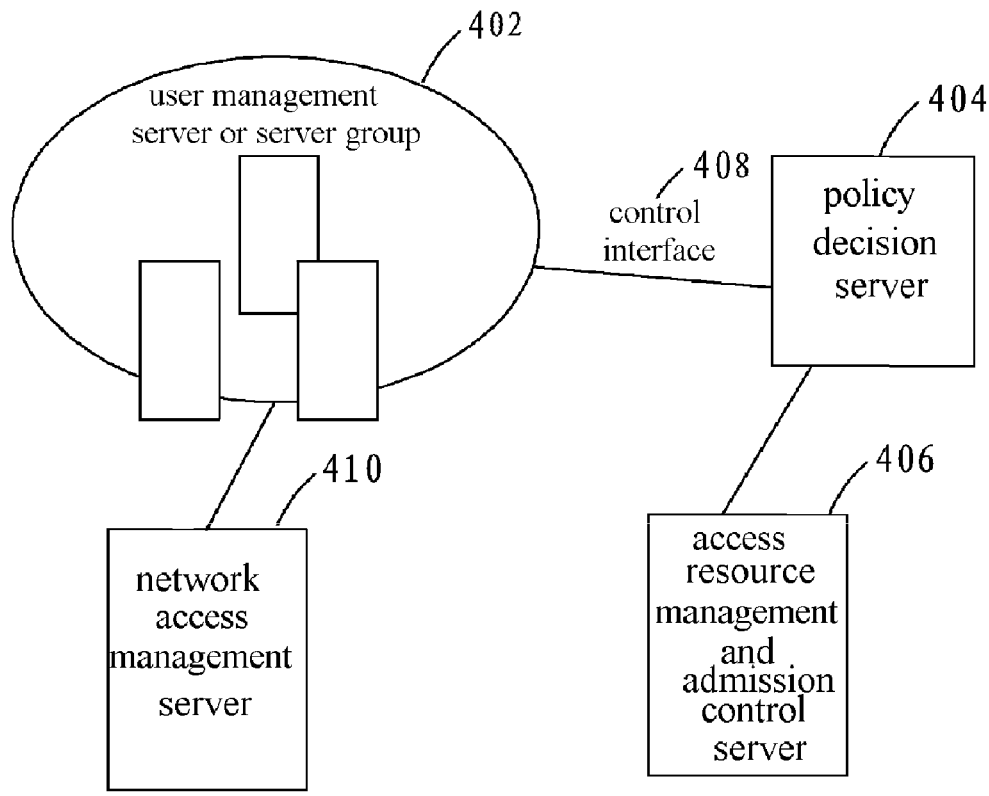
FIG. 6 illustrates a control system according to one embodiment of the invention.

The control system 400 according to this embodiment further includes: a network access management server 410 adapted to send the location identifier information and/or location information of the user access point to the user management server or server group 402 while a user is being attached to network. FIG. 6 illustrates an example of the control system. As illustrated in FIG. 6, the user management server or server group is connected with the policy decision server via the control interface, the network access management server is connected with the user management server or server group, and the access resource management and admission control server is connected with the policy decision server.

Figure 5:
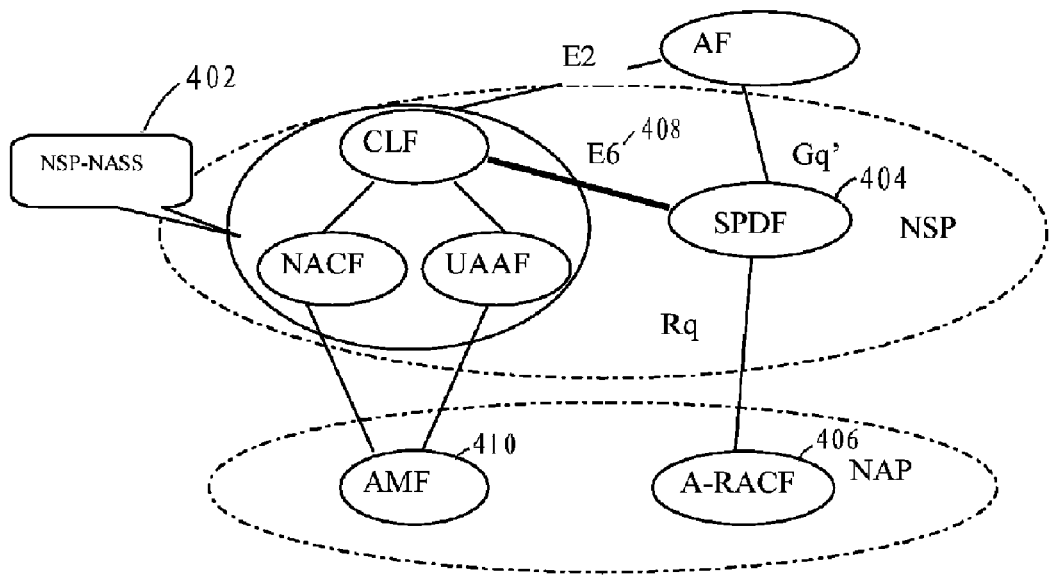
FIG. 5 is a logical diagram of a control system according to the first embodiment of the invention.

As illustrated in FIG. 5, the policy decision server 404 (an SPDF) and the user management server or server group 402 (an NSP-NASS) are in a same NSP domain. Via the control interface 408 (E6) configured between them, the policy decision server 404 (an SPDF) can acquire user-related information, e.g., location information of a user access point, through the user management server or server group 402 (an NSP-NASS), or directly acquire address information of the access resource management and admission control server of a user, so that the access resource management and admission control server 406 (an A-RACF) can be easily found. A same procedure can be used in the case of roaming.

Figure 7:
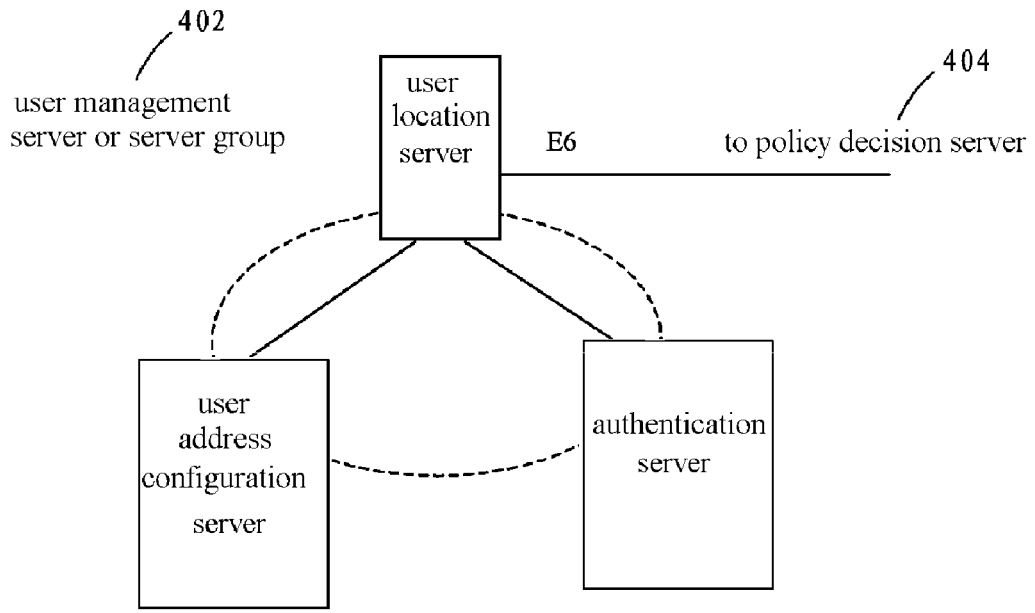
FIG. 7 illustrates a user management server or server group according to one embodiment of the invention.

The user management server or server group 402 performs user authentication, user address distribution, user location information collection and storage, etc. As illustrated in FIG. 7, which illustrates an example of the user management server or server group, the user management server or server group 402 can include a user location server adapted to collect and store user location information; a user address configuration server used for user address distribution; or an authentication server used for authentication. The policy decision server 404 implements user-based policy decision functions or service-based policy decision functions. The access resource management and admission control server 406 carries out resource management at the network managed by the access resource management and admission control server, and admission control of QoS requests.

Further, the user location information can include location identifier information and location information of a user access point. Particularly, the location identifier information includes an IP address and a name of the access resource management and admission control server 406, and location information by which the access resource management and admission control server 406 can be uniquely determined. The location information includes a network domain identifier. The location information of a user access point includes an identifier of an access device of the user access point, or a physical port number and/or a logic port number of the user access point. The logic port number includes a Virtual Path (VP), permanent Virtual Circuit (VC), Virtual LAN (VLAN) or user Medium Access Control (MAC) address of a user access line.

Figure 1:
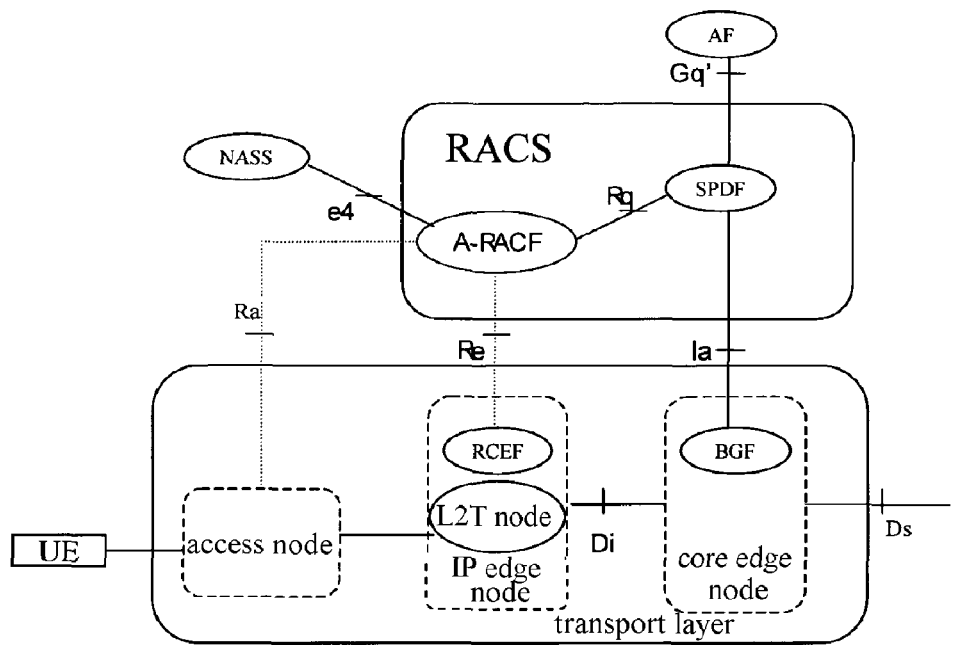
FIG. 1 illustrates network architecture of a TISPAN RACS.
Figure 2:
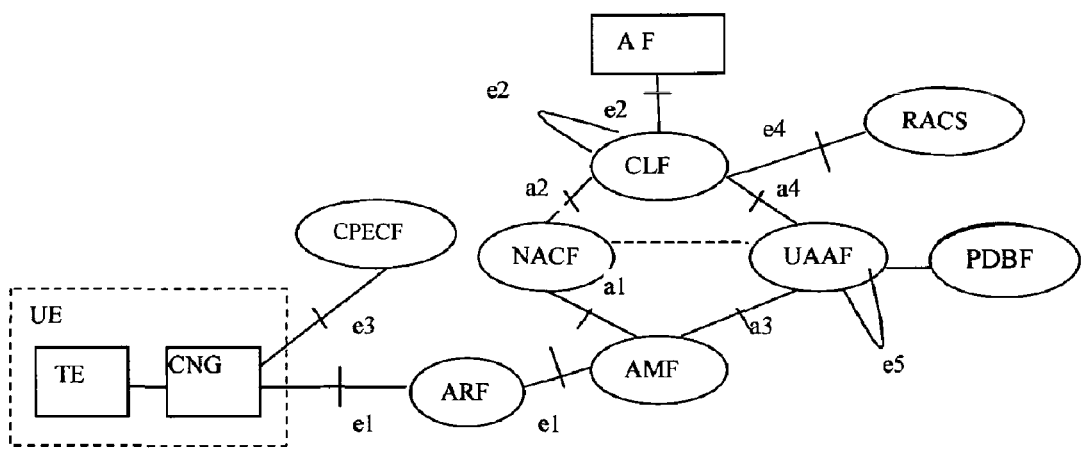
FIG. 2 is structural diagram of an NASS.
Figure 3:
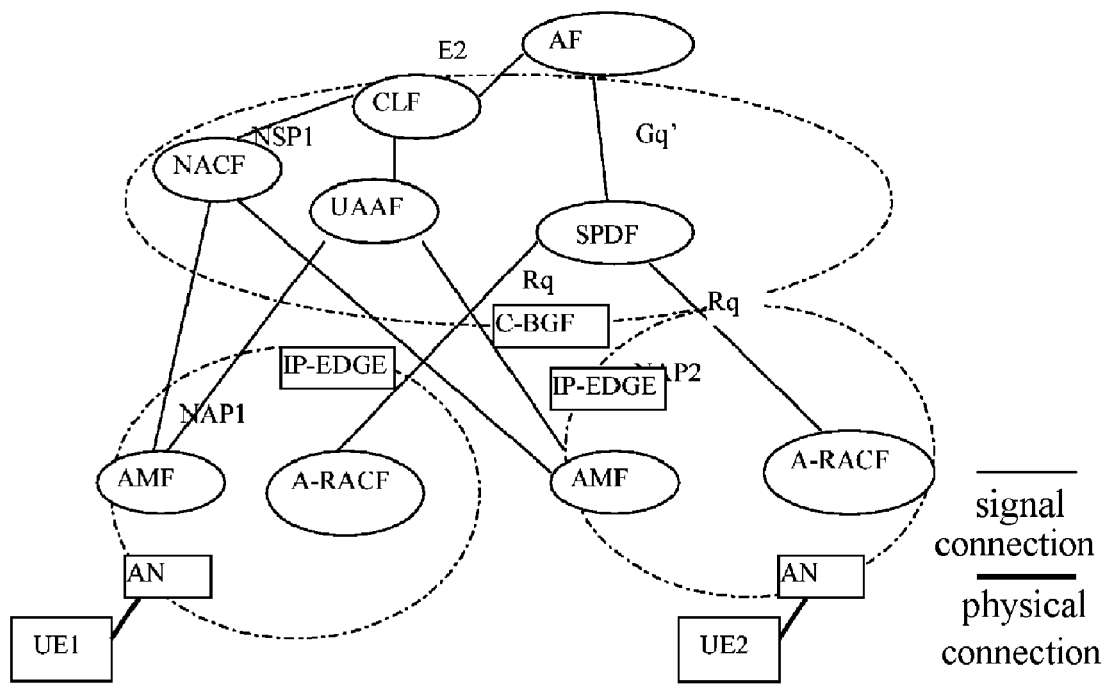
FIG. 3 is a structural diagram of mapping NASS RACS to NAP NSP.

In addition, the e4 interface used in the related art as illustrated in FIG. 1 and FIG. 2 can be replaced with the control interface in the first embodiment of the invention.

Embodiment 2

A control method using the control system according to the first embodiment is provided by a second embodiment of the present invention. The second embodiment of the invention is described hereinafter with reference to FIG. 8 which is a flow chart of the control method according to the second embodiment of the invention.

Figure 8:
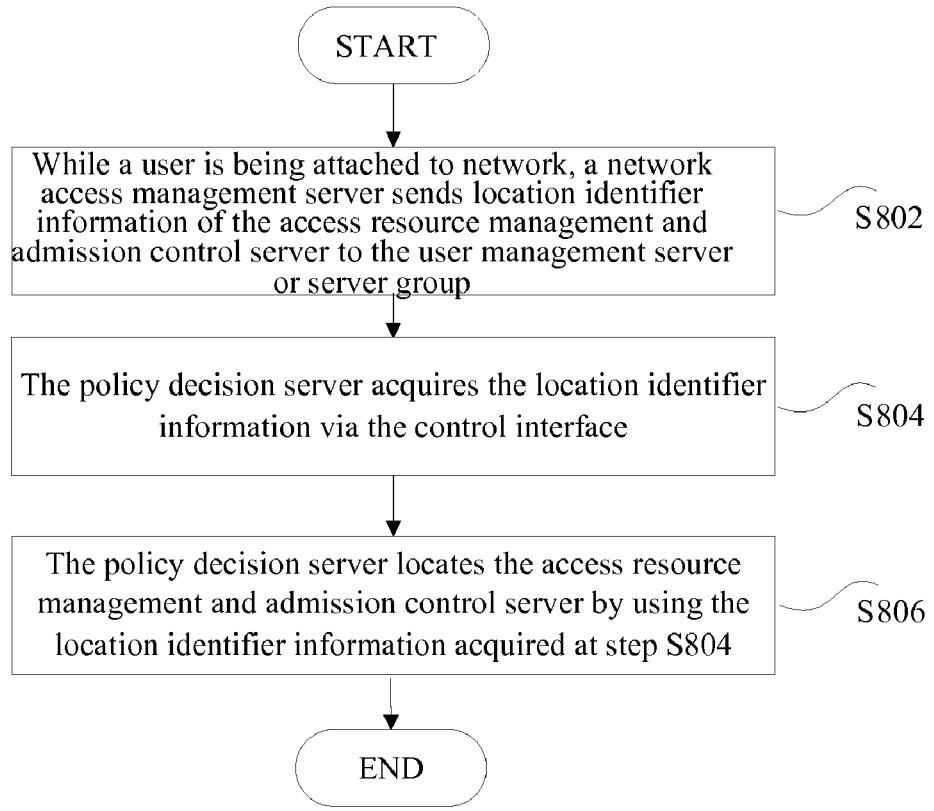
FIG. 8 is a flow chart of a control method according to another embodiment of the invention.

As illustrated in FIG. 8, a control method according to the second embodiment of the invention includes as follows.

Step S802: While a user is being attached to network, the network access management server sends location identifier information of the access resource management and admission control server to the user management server or server group.

Step S804: The policy decision server acquires the location identifier information via the control interface between the user management server or server group and the policy decision server.

Step S806: The policy decision server locates the access resource management and admission control server by using the location identifier information acquired at step S804.

Particularly, in different cases the step S804 can include different steps as follows.

Example 1

The step S804 includes.

Step S804-1: The user management server or server group sends the location identifier information and user identifier information with a corresponding relationship via the control interface.

Step S804-2: The policy decision server receives the location identifier information via the control interface.

Example 2

The step S804 includes.

Step S804-1': The policy decision server sends a request message with user identifier information to the user management server or server group via the control interface.

Step S804-2': The user management server or server group returns the location identifier information corresponding to the user identifier information to the policy decision server in response to the request message.

Particularly, the user management server or server group can include any one or a combination of: a user location server adapted to collect and store user location information, a user authentication server adapted to authenticate users, a user address configuration server adapted to distribute user addresses, or a database server adapted to store user data.

The location identifier information includes an IP address and a name of the access resource management and admission control server, and location information by which the access resource management and admission control server can be uniquely determined. The location information includes a network domain identifier.

When a network domain identifier is used as the location information, the policy decision server performs service-based DNS lookup at step S806 based on the network domain identifier (in accordance with RFC2782), thereby completing the operation of location.

The location information of a user access point includes an identifier of an access device of the user access point, or a physical port number and/or a logic port number of the user access point. The logic port number includes a VP, VC, VLAN or user MAC address of a user access line.

Embodiment 3

A control method using the control system according to the first embodiment is provided by a third embodiment of the invention. The third embodiment of the invention is described hereinafter with reference to FIG. 9 which is a flow chart of the control method according to the third embodiment of the invention.

Figure 9:
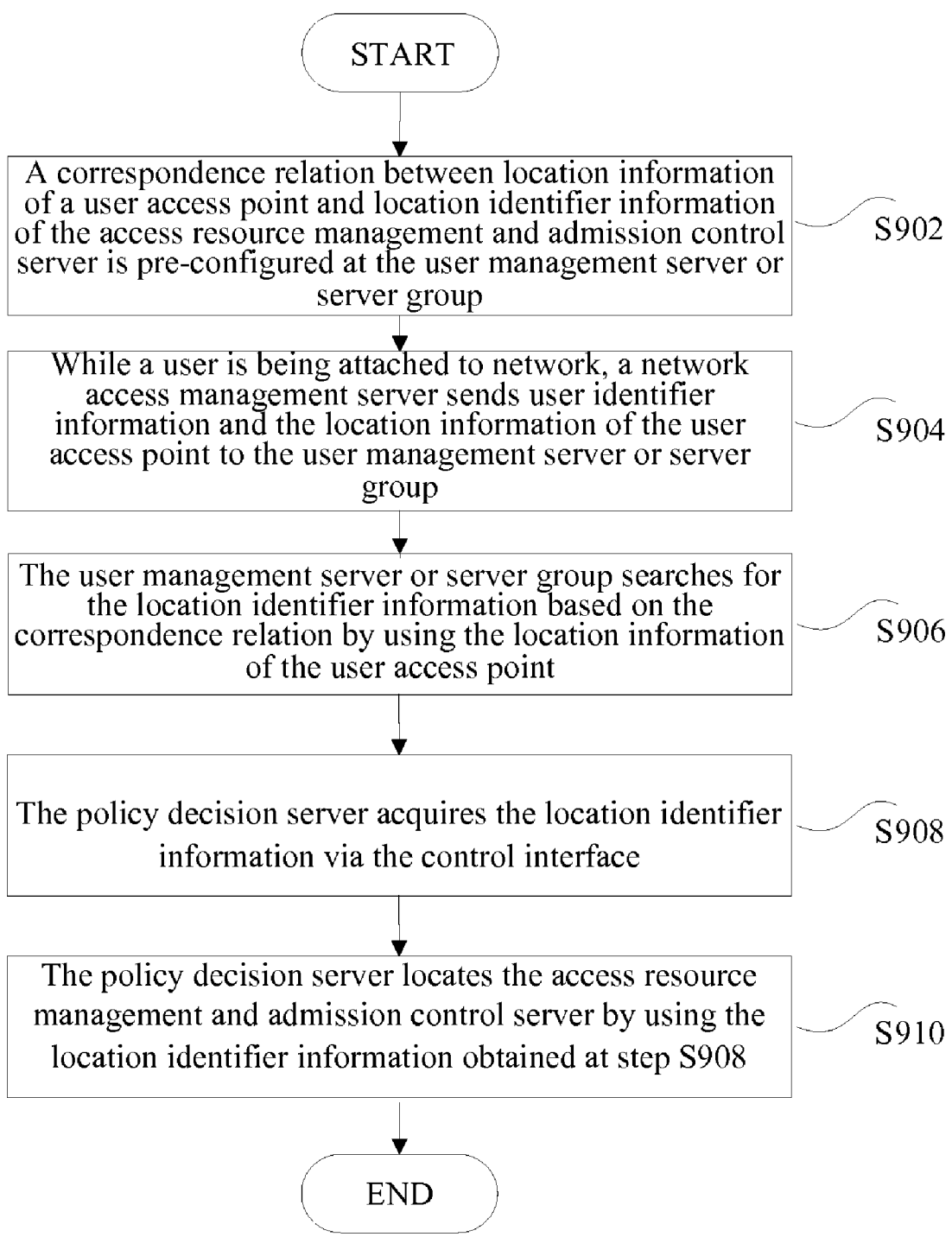
FIG. 9 is a flow chart of a control method according to another embodiment of the invention.

As illustrated in FIG. 9, a control method according to the third embodiment of the invention includes as follows.

Step S902: A corresponding relationship between location information of a user access point and location identifier information of the access resource management and admission control server is pre-configured at the user management server or server group.

Step S904: While a user is being attached to network, a network access management server sends user identifier information and the location information of the user access point to the user management server or server group.

Step S906: The user management server or server group searches for the location identifier information by using the location information of the user access point based on the corresponding relationship.

Step S908: The policy decision server acquires the location identifier information via the control interface between the user management server or server group and the policy decision server.

Step S910: The policy decision server locates the access resource management and admission control server by using the location identifier information acquired at step S908.

Particularly, in different cases, the step S908 can include different steps as follows.

Example 1

The step S908 includes.

Step S908-1: The user management server or server group sends the location identifier information and the user identifier information with the corresponding relationship via the control interface.

Step S908-2: The policy decision server receives the location identifier information via the control interface.

Example 2

The step S908 includes:

Step S908-1': The policy decision server sends a request message with the user identifier information to the user management server or server group via the control interface.

Step S908-2': The user management server or server group returns the location identifier information corresponding to the user identifier information to the policy decision server in response to the request message.

The user management server or server group can include any one or a combination of: a user location server adapted to collect and store user location information, a user authentication server adapted to authenticate users, a user address configuration server adapted to distribute user addresses, or a database server adapted to store user data.

The location identifier information includes an IP address and a name of the access resource management and admission control server and location information by which the access resource management and admission control server can be uniquely determined. The location information includes a network domain identifier. When a network domain identifier is used as the location information, at step S910, the policy decision server performs service-based DNS lookup based on the network domain identifier, thereby completing the operation of location.

The location information of a user access point includes an identifier of an access device of the user access point, or a physical port number and/or a logic port number of the user access point. The logic port number includes VP, VC, VLAN or user MAC address of a user access line.

Embodiment 4

A control method using the control system according to the first embodiment is provided in a fourth embodiment of the invention. The third embodiment of the invention is described hereinafter with reference to FIG. 10 is a flow chart of the control method according to the fourth embodiment of the invention.

Figure 10:
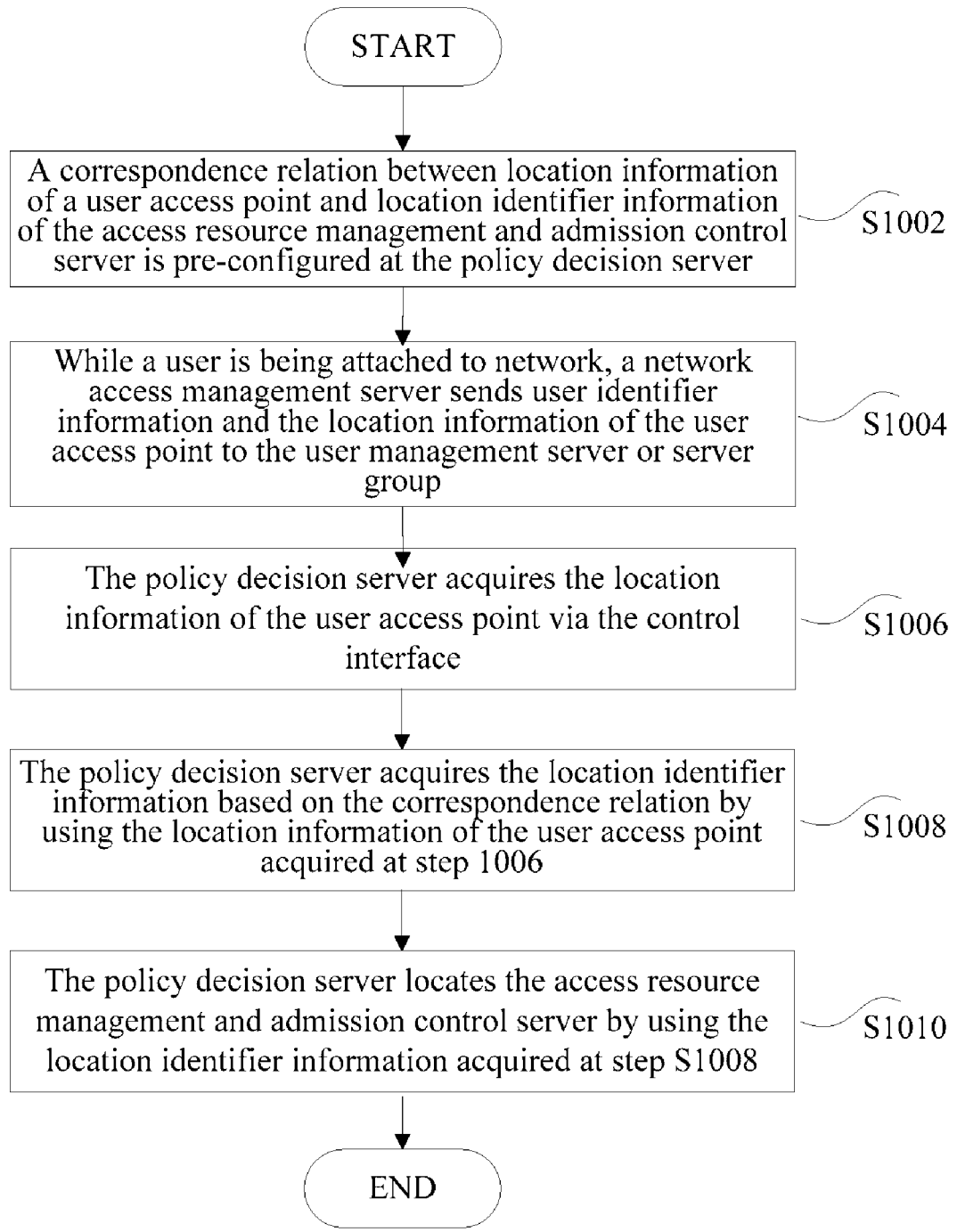
FIG. 10 is a flow chart of a control method according to another embodiment of the invention.

As illustrated in FIG. 10, the control method according to the fourth embodiment of the invention includes as follows.

Step S1002: A corresponding relationship between location information of a user access point and location identifier information of the access resource management and admission control server is pre-configured at the policy decision server.

Step S1004: While a user is being attached to network, a network access management server sends user identifier information and the location information of the user access point to the user management server or server group.

Step S1006: The policy decision server acquires the location information of the user access point via a control interface.

Step S1008: The policy decision server acquires the location identifier information by using the location information of the user access point acquired at step 1006 based on the corresponding relationship.

Step S1010: The policy decision server locates the access resource management and admission control server by using the location identifier information acquired at step S1008.

Particularly, in different cases, the step S1006 can include different steps as follows.

Example 1

The step S1006 includes.

Step S1006-1: The user management server or server group sends the user identifier information and the location information of the user access point with the corresponding relationship via the control interface between the user management server or server group and the policy decision server.

Step S1006-2: The policy decision server receives the location identifier information via the control interface.

Example 2

The step S1006 includes.

Step S1006-1': The policy decision server sends a request message with the user identifier information to the user management server or server group via the control interface, requesting for the location information of the user access point.

step S1006-2': The user management server or server group returns the location information of the user access point corresponding to the user identifier information to the policy decision server in response to the request message.

Particularly, the user management server or server group can include any one or a combination of: a user location server adapted to collect and store the user location information, a user authentication server adapted to authenticate users, a user address configuration server adapted to distribute user addresses, or a database server adapted to store user data.

The location identifier information includes an IP address and a name of the access resource management and admission control server, and location information by which the access resource management and admission control server can be uniquely determined. The location information includes a network domain identifier. When a network domain identifier is used as the location information, at step S1010 the policy decision server performs service-based DNS lookup based on the network domain identifier (in accordance with RFC2782), thereby completing the operation of location. The location information of a user access point includes an identifier of an access device of the user access point, or a physical port number and/or a logic port number of the user access point. The logic port number includes a VP, VC, VLAN or user MAC address of a user access line.

Further, the interface e4 used in the related art as illustrated in FIG. 1 and FIG. 2 can be replaced with the control interface in the first embodiment of the invention. In this case, the process of resource control is as illustrated as FIG. 11.

Figure 11:
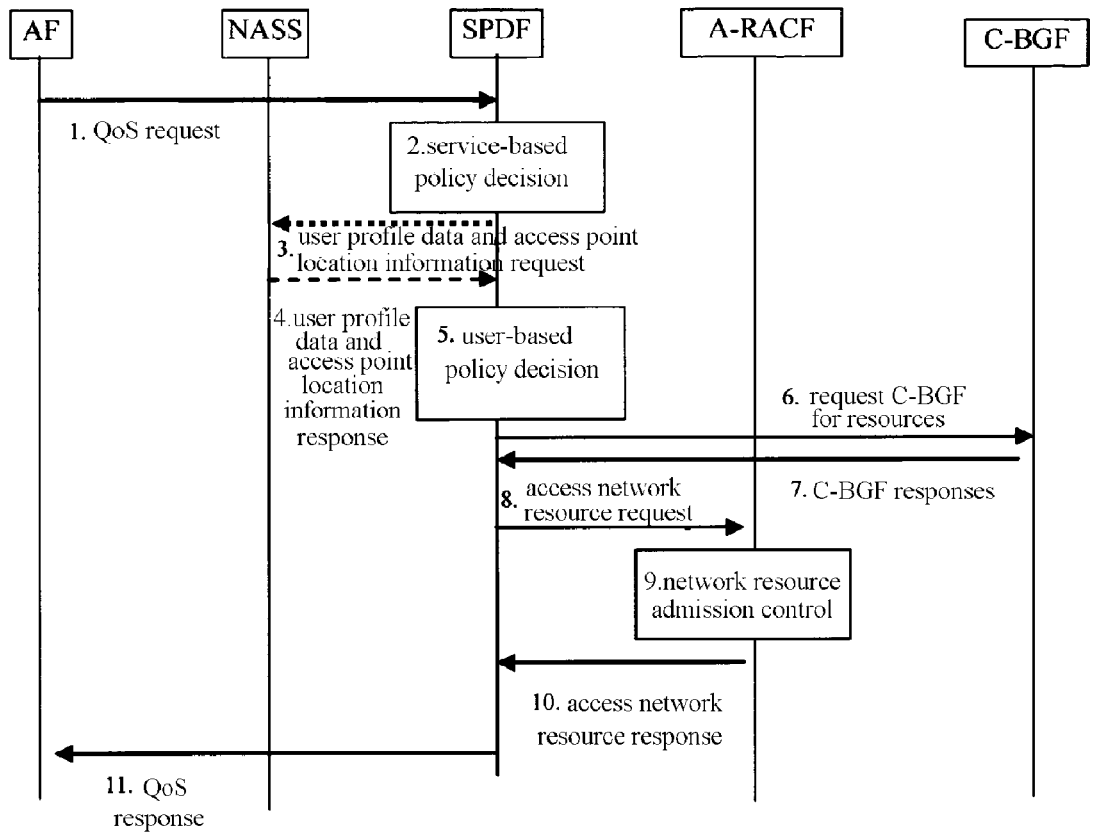
FIG. 11 illustrates the process of a control method according to an embodiment of the invention.

Refer to FIG. 11. With the introduction of the control interface according to the invention, QoS control flow is as follows: (1) an AF sends a QoS request with a user identifier (user IP address, or user name) to an SPDF; (2) the SPDF makes a service-based policy decision, and if the request is accepted, go to step (3), otherwise the request is rejected and the AF is informed; (3) the SPDF requests an NASS for user profile information and location information of a user access point; (4) the NASS returns the user profile information and the location information of a user access point to the SPDF in response to the request; (5) the SPDF makes a user-based policy decision if the request is accepted, go to step (6), otherwise the request is rejected and the AF is informed; (6) the SPDF requests a C-BGF for resources; (7) the C-BGF responds to the resource request; (8) the SPDF requests a A-RACF for access network resources; (9) the A-RACF performs admission control according to current condition of network resources; (10) the A-RACF responds to the resource request; and (11) the SPDF responds to the AF.

Embodiment 5

A control device provided in a fifth embodiment of the invention is described hereinafter with reference to FIG. 12, a block diagram of the control device according to the fifth embodiment of the invention.

Figure 12:
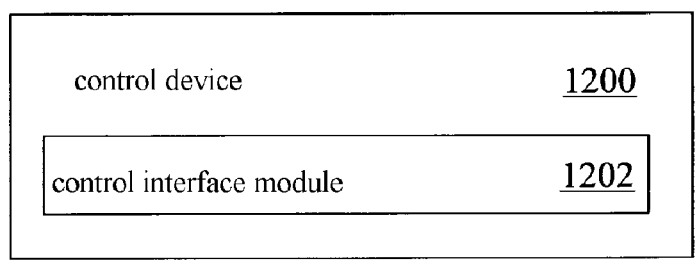
FIG. 12 is a block diagram of a control device according to another embodiment of the invention.

As illustrated in FIG. 12, a control device 1200 according to the fifth embodiment of the invention includes: a control interface module 1202 between a user management server or server group and a policy decision server, adapted to transfer location identifier information or location information of a user access point; a user management server or server group, and a policy decision server (not shown in the figures).

The user management server or server group sends the location identifier information of the access resource management and admission control server or the location information of the user access point to the policy decision server via the control interface module.

The location identifier information includes an IP address and a name of the access resource management and admission control server and location information by which the access resource management and admission control server can be uniquely determined. The location information includes a network domain identifier. The location information of a user access point includes an identifier of an access device of the user access point, or a physical port number and/or a logic port number of the user access point. The logic port number includes a VP, VC, VLAN or user MAC address of a user access line.

Embodiment 6

Figure 13:
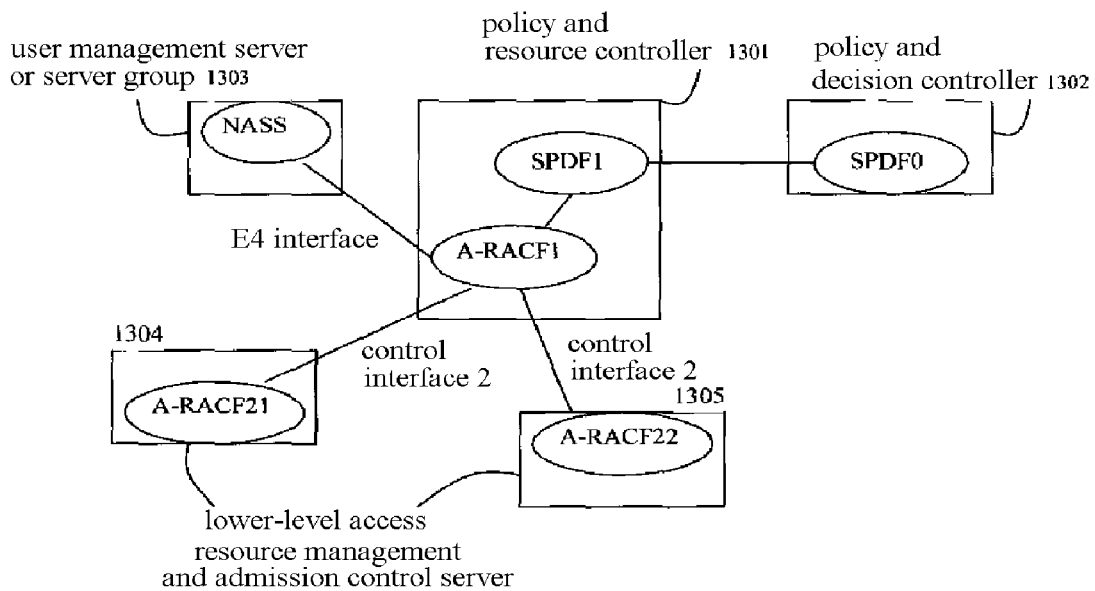
FIG. 13 illustrates network architecture of another embodiment of the invention.

In a large regional network, a single access resource management and admission control server cannot handle all admission control requests. Therefore, a hierarchal network structure of resource management is provided by an embodiment of the present invention, as illustrated in FIG. 13. This embodiment is not based on the first embodiment of the invention, including a user management server or server group 1303, a policy and resource controller 1301, and at least one lower-level access resource management and admission control server, i.e., access resource management and admission control servers 1304 and 1305 as illustrated in FIG. 13.

The SPDF1 belongs to a local access operator and the SPDF1 belongs to a network connection service operator, both of which implements operator-established policies. The policy and resource controller 1301 implements functions of two function entities SPDF and A-RACF. The policy and resource controller 1301 provides a unique control connection point to the outside, receives requests from a policy and decision controller (the physical entity SPDF0) of the network connection service operator, and carries out policy control of requested services and admission control of resources in a network domain managed by the policy and resource controller (typically the core part of a metropolitan area network). The lower-level access resource management and admission control servers 1304 and 1305 manages part of the resources in the network domain (typically one or more access convergence networks of a metropolitan area network) respectively. The policy and resource controller 1301 is connected with the lower-level access resource management and admission control servers 1304 and 1305 via a control interface 2 to transfer resource requests and responsive signaling messages. The policy and resource controller 1301 is connected with the user management server or server group 1303 via a standard control interface 1, i.e., E4 interface. This embodiment describes a preferred control implementation structure. Alternatively, the policy and resource controller 1301 can be implemented by a separate policy decision server (to implement the function entity SPDF1) and a separate access resource management and admission control server (to implement the function entity A-RACF1) with a connection relation same as this embodiment.

In the case as illustrated in FIG. 13, there is still a problem for a policy and resource controller 1301 to find a lower-level access resource management and admission control server on receipt of a QoS request. A method to solve the problem is provided according to a seventh embodiment of the invention.

Embodiment 7

A control method using the system according to the sixth embodiment is provided by this embodiment, for a policy and resource controller (corresponding to the case where an SPDF and a top-level A-RACF are implemented in a same physical entity) or an access resource management and admission control server (corresponding to the case where a top-level A-RACF is separately implemented in a physical entity) to find a lower-level access resource management and admission control server.

Figure 14:
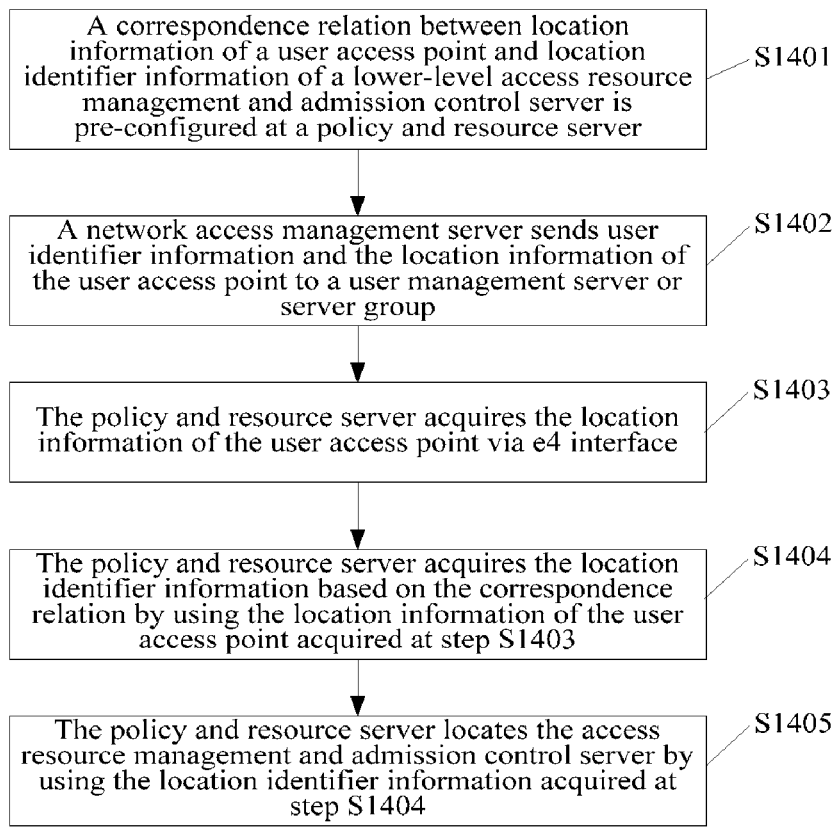
FIG. 14 is a flow chart of a control method according to another embodiment of the invention.

As illustrated in FIG. 14, the control method according to the seventh embodiment of the invention includes.

Step S1401: A corresponding relationship between location information of a user access point and location identifier information of the lower-level access resource management and admission control server (e.g., 1304 in FIG. 13) are pre-configured at the policy and resource server.

Step S1402: A network access management server sends user identifier information and the location information of the user access point to the user management server or server group.

Step S1403: The policy and resource server acquires the location information of the user access point via interface e4.

Step S1404: The policy and resource server acquires location identifier information based on the corresponding relationship by using the location information of the user access point acquired at step S1403.

Step S1405: The policy and resource server locates the access resource management and admission control server by using the location identifier information acquired at step S1404.

This method is also applicable when the function entity A-RACF1 is implemented by a separate physical entity as illustrated in FIG. 13, replacing the policy and recourse server in the above steps with an access resource management and admission control server.

The location identifier information includes an IP address and a name of the lower-level access resource management and admission control server and location information by which the lower-level access resource management and admission control server can be uniquely determined. The location information includes a network domain identifier. When a network domain identifier is used as the location information, at step S1405 the policy decision server performs service-based DNS lookup based on the network domain identifier (in accordance with RFC2782), thereby completing the operation of location. The location information of a user access point includes an identifier of an access device of the user access point, or a physical port number and/or a logic port number of the user access point, where the logic port number includes a VP, VC, VLAN or user MAC address of a user access line.

Exemplary embodiments of the invention are described as above, which are not intended to limit the present invention. It should be noted that those skilled in the art can make various changes or modifications without departing from the spirit and principle of the invention. These changes, equivalent alternations and modifications should be included within the scope of the invention.

The invention claimed is:

1. A control system comprising:
at least one Network Attachment Subsystem (NASS), a Session Policy Decision Function (SPDF) and an Access Resource Access Control Function (A-RACF); and
a control interface, between the at least one NASS and the SPDF, adapted to transfer information;
wherein the at least one NASS is configured to send one of location identifier information of the A-RACF and location information of a user access point to the SPDF via the control interface, wherein the SPDF is configured to locate the A-RACF according to one of the location identifier information of the A-RACF and the location information of a user access point.

2. The control system according to claim 1, further comprising:
a network access management server, adapted to send the location identifier information and the location information of the user access point to the at least one NASS while a user is being attached to network.

3. The control system according to claim 1, wherein the at least one NASS is configured to send one of the location identifier information of the A-RACF and the location information of the user access point to the SPDF comprises one of the followings:
the at least one NASS is configured to send the location identifier information of the A-RACF together with user identifier information via the control interface, wherein the user identifier information has a corresponding relationship with the location identifier information; and
the at least one NASS is configured to send the location identifier information of the A-RACF to the SPDF in response to a request message carrying the user identification information from the SPDF, wherein the user identification information has the corresponding relationship with the location identification information.

4. The control system according to claim 1 wherein the at least one NASS comprises at least one of: a user location server adapted to collect and store user location information, a user authentication server adapted to authenticate a user, a user address configuration server adapted to assign a user address, and a database server adapted to store user data.

5. The control system according to claim 1 wherein the location identifier information of the A-RACF comprises an IP address, name of the A-RACF, and location information by which the A-RACF can be uniquely determined, wherein the location information by which the A-RACF can be uniquely determined comprises a network domain identifier,
wherein the location information of a user access point comprises one of an identifier of an access device of the user access point, a physical port number and a logic port number of the user access point, the logic port number comprising a virtual path, a permanent virtual circuit, a virtual local area network, and a user medium access control address of a user access line.

6. A control method using the control system according to claim 1, for finding a plurality of A-RACFs, comprising:
sending, by a network access management server, location identifier information of the A-RACF to the NASS;
acquiring, by the SPDF, the location identifier information via the control interface between the NASS and the SPDF; and locating, by the SPDF, the A-RACF by using the acquired location identifier information.

7. The control method according to claim 6, wherein the process of the SPDF acquiring the location identifier information via the control interface comprises:
sending, by the NASS, the location identifier information of the A-RACF together with user identifier information via the control interface, wherein the location identifier information of the A-RACF has a corresponding relationship with the user identifier information; and
receiving, by the SPDF, the location identifier information of the A-RACF via the control interface.

8. The control method according to claim 6, wherein the process of the SPDF acquiring the location identifier information via the control interface comprises:
sending, by the SPDF, a request message to the NASS via the control interface, wherein the message carries user identification information; and returning, by the NASS, the location identifier information corresponding to the user identifier information to the SPDF in response to the request message.

9. The control method according to claim 6, wherein the NASS comprises any one or a combination of:
   a user location server adapted to collect and store user location information,
   a user authentication server adapted to authenticate a user,
   a user address configuration server adapted to assign a user address, and
   a database server adapted to store user data.

10. The control method according to claim 6, wherein the location identifier information of the A-RACF comprises an IP address, a name of the A-RACF, and location information by which the A-RACF can be uniquely determined, wherein the location information comprising a network domain identifier.

11. The control method according to claim 10, wherein when a network domain identifier is used as the location information, the SPDF performs service-based DNS lookup based on the network domain identifier to complete the operation of location.

12. The control method according to claim 6, wherein the location information of the user access point comprises at least one of the following: an identifier of an access device of the user access point, a physical port number, and a logic port number of the user access point, wherein the logic port number comprises at least one of the following: a virtual path, permanent virtual circuit, virtual local area network and a user medium access control address of a user access line.

* * * * *